(12) United States Patent
Rembe

(10) Patent No.: US 7,663,764 B2
(45) Date of Patent: Feb. 16, 2010

(54) MEASURING DEVICE AND METHOD TO OPTICALLY MEASURE AN OBJECT

(75) Inventor: Christian Rembe, Waldbronn (DE)

(73) Assignee: Polytec GmbH, Waldbronn (DE)

( * ) Notice: Subject to any disclaimer, the term of this patent is extended or adjusted under 35 U.S.C. 154(b) by 252 days.

(21) Appl. No.: 11/627,124

(22) Filed: Jan. 25, 2007

(65) Prior Publication Data

US 2007/0177154 A1 Aug. 2, 2007

(30) Foreign Application Priority Data

Jan. 27, 2006 (EP) .................................. 06001676

(51) Int. Cl.
*G01B 9/02* (2006.01)
(52) U.S. Cl. .................. 356/498; 356/486; 356/487; 356/493
(58) Field of Classification Search .............. 356/486, 356/498, 487, 493
See application file for complete search history.

(56) References Cited

U.S. PATENT DOCUMENTS 5,317,376 A 5/1994 Amzajerdian et al.
2007/0002333 A1* 1/2007 Ueki et al. .................. 356/512

FOREIGN PATENT DOCUMENTS

DE 4313076 10/1993
DE 4414514 11/1995

* cited by examiner

*Primary Examiner*—Hwa (Andrew) S Lee
(74) *Attorney, Agent, or Firm*—Volpe and Koenig, P.C.

(57) ABSTRACT

A measuring device for the optic measuring of an object 13a is provided, in particular for measuring a motion of the object. The device includes an interferometer 20 with a measuring beam exit 12, a reflection beam entry 14, an interfering beam exit 15, and a light source 1 for creating a light beam 8, an optic detector 16, which is arranged at the interfering beam exit 15 of the interferometer 20 such that a light beam exiting the interfering beam exit 15 impinges the detector and a signal processing unit 17 connected to the detector 16 being embodied such that they can measure measuring signals of the detector 16. The interferometer (20) is provided with a switched beam entry (18) and is embodied such that dependent on a switching signal connected to a switched beam entry (18) a light beam exits the measuring beam exit (12) essentially with a predetermined light intensity and at a predetermined angle, and that the signal processing unit (17) is provided with a switched beam exit, which is connected to the switched beam entry (18) of the interferometer, with the signal processing unit (17) controlling the interferometer such that a light beam exits the measuring beam exit (12) only during the measuring of measuring signals essentially with a predetermined light intensity and at a predetermined angle.

20 Claims, 1 Drawing Sheet

MEASURING DEVICE AND METHOD TO OPTICALLY MEASURE AN OBJECT

CROSS-REFERENCE TO RELATED APPLICATIONS

This application claims priority from European application no. 06001676.3, filed Jan. 27, 2006, which is incorporated by reference herein as if fully set forth.

BACKGROUND

The invention relates to a measuring device and a method to optically measure an object.

Accordingly, the measuring device comprises an interferometer with a light source, with the interferometer being embodied such that a light beam created by the light source is split into at least two partial beams.

A first partial beam is used as a measuring beam for radiating a measuring point on the object to be measured. For this purpose the measuring beam essentially exits the interferometer at a predetermined angle. The measuring beam reflected by the object enters the interferometer as a reflection beam through a reflection beam entry and is here interfered with a second partial beam. The second partial beam and the interfering reflection beam exit the interferometer through an interference beam exit.

The measuring device is further provided with an optic detector, which is arranged at the interference beam exit of the interferometer such that the second partial beam impinges the detector together with the interfered reflection beam.

A signal processing unit of the measuring device is connected to the detector and measures the measuring signals of the detector. The measurement may comprise collection and/or evaluation and/or processing of the measuring signals.

In typical measuring devices of the above-described type the light source is embodied as a laser, which created an essentially monochromatic light beam. By interfering the second partial beam and the reflection beam an interference signal develops on the optic detector, from which for example the phase difference of the two interfered beams can be determined by way of demodulation, which in turn allows the determination of the displacement of the object in the area of the measuring point.

Furthermore, the actual speed of the movement of the measuring point of the object can be determined by demodulation of the temporal deduction of the phase difference.

The precision of the above-described measurements performed depends on several factors:

When in a grid scan, several points on the object to be measured are measured one after the other, the spatial resolution essentially depends on the size of the measuring spots, i.e. of the diameter of the measuring beam impinging the measuring point of the object to be measured.

If very small structures are measured, for example in micro technology, it is essential that the measuring spot has a maximum size equivalent to approximately the size of said micro structures. If a lateral resolution shall be achieved for the micro structures, for example via a grid scan, a further reduction of the size of the measuring spot is necessary. Typical micro structures require a diameter of the measuring spot smaller than 1 μm.

However, the precision of the measurement also depends on the quality of the signal measured by the optic detector. This signal, in turn, depends on the intensity of the reflection beam and thus also on the intensity, by which the object to be measured is impinged by the measuring beam.

In particular the measuring of oscillations of small structures in micro technology requires a measuring beam of high intensity in order to yield a good signal-noise ratio. This leads, together with the requirement of a small diameter of the measuring spot, to a high irradiance on the object to be measured.

Due to the high irradiance, the measurement may cause a high energy input into the object to be measured when conventional measuring devices are used for the optical measurement of an object, and thus lead to falsify the measurement and to the destruction of the object to be measured in particular in structures of micro technology.

SUMMARY

The invention is therefore based on the objective of providing a measuring device and a method for the optical measurement of an object, which improves the quality of the measurement, in particular by reducing the negative influences of an energy input by the measuring beam into the object to be measured.

This objective is attained by a measuring device and method in accordance with the invention.

Advantageous embodiments of the measuring devices and methods according to the invention are described below.

The invention generally differs from prior art in that the interferometer of the measuring device is provided with a switched beam entry and the interferometer is embodied such that dependent on a switching signal connected to the switched beam entry, a light beam essentially exits the measurement beam exit with a predetermined intensity and at a predetermined angle.

The signal processing unit of the measuring device according to the invention is provided with a switched beam exit, which is connected to the switched beam entry of the interferometer. During the measurement of measuring signals by the signal processing unit, the unit controls the interferometer such that a light beam essentially exits the measuring beam exit at a predetermined angle and a predetermined intensity for the measuring.

After a measurement is concluded, the signal processing unit controls the interferometer such that no light beam essentially exits the measuring beam exit at a predetermined intensity and/or a predetermined angle.

For example, the signal processing unit can send a switching signal to the interferometer during the measuring only and the interferometer can be embodied such that only when a measuring signal is connected to the switched beam entry a light beam can exit the measuring beam exit at an essentially predetermined angle and with a predetermined measuring intensity. Of course, other transfer forms of the switching information are also possible, such as e.g., an inversion of the switching signal.

The interferometer may be embodied for example such that, when no switching signal is connected to the switched beam entry of the interferometer, no light beam can exit the measurement beam exit or for example exits such that, although a light beam exits the measurement beam exit it is different from the predetermined angle, so the measuring point on the object to be measured is not lit by the measuring beam.

It is essential that, when no switching signal is connected to the light entry switch, the measuring beam does not exit the measuring beam exit in the predetermined intensity for the measuring and/or not at the predetermined angle.

Thus, an essential reduction of the energy input into the object to be measured occurs in the area of the measuring point. Because, due to the fact that after a measurement is concluded, the measurement point is no longer lit or no longer lit with the full intensity, no heating of the measuring object occurs in particular in the area of the measuring point and falsifications of the measurement signal and/or a destruction of the measurement object by such heating can be avoided.

Advantageously, the inferometer is provided with a dimmer unit, which is arranged in the radiation path of the measurement beam. The dimmer unit is connected to the switched beam entry and embodied such that the intensity of the measuring beam is reduced when no switching signal is connected. When a switching signal is connected, i.e. during the measuring of measuring signals, the measuring beam penetrates the dimmer unit without any essential loss of intensity, while a reduction of intensity of the measuring beam by a predetermined factor occurs when no switching signal is connected.

Advantageously when no switching signal is connected the intensity is reduced by a dimmer unit by at least 90%, particularly at least 98%, most particularly by at least 99%, i.e. after penetrating the dimmer unit the intensity of the measuring beam amounts only to 10%, particularly 2%, most particularly 1% of the original intensity.

It is also possible for the dimmer unit to reduce the intensity of the measuring beam to 0 when no switching signal is connected, i.e. to block the measuring beam.

A reduction of the intensity of the measuring beam when no switching signal is connected, is advantageous in reference to a total blockage in that the measuring component, such as for example the evaluation unit, can also perform preparatory measurement adjustments, such as e.g. calibration or initialization processes, using a measurement beam of reduced intensity, so that they need not be performed with the full intensity of the measurement beam used for the measurement itself and that the measuring time and the energy input into the measurement object can thus be reduced when the full intensity of the measurement beam is used. Additionally, the positioning of the object to be measured, i.e. the alignment of the object to be measured in reference to the measuring beam as well as a focusing of the measuring beam is possible with a dimmed intensity of the measurement beam.

The device according to the invention allows for the first time the use of measurement beams with diameters creating a measurement spot on the object to be measured having a diameter less than 1 μm with a simultaneously higher intensity of the measuring beam. This way a high measurement accuracy can be achieved in the measurement. Additionally, when using measurement spots with larger diameters, an increase in the light intensity of the measurement beam can be yielded without falsifying the measurement by an energy input into the measurement object so that here too an increase in the measurement accuracy is achieved.

When measuring oscillations, the minimum oscillation frequency that can be measured depends on the duration of the measuring. The longer the time of the measurement the smaller the minimum frequency that can be determined by the measuring process.

In a particular exemplary embodiment, the signal processing unit is embodied such that the measuring signals of the detector are measuring for at least the duration $t_{min}$. Here, $t_{min}$ is equivalent to the inverse of a predetermined minimum frequency $f_{min}$, i.e. the minimum frequency which is still to be detected by the measurement.

In order to avoid falsification of the measurement and/or destruction of the object to be measured by an energy input into the measuring object being too high it is useful when a maximum time is predetermined for a measuring process. In another advantageous embodiment, the signal processing unit is therefore embodied such that it measures the measuring signals of the detector no longer than for a term of a predetermined maximum time $t_{max}$.

The maximum time $t_{max}$ can here be predetermined based on experience values for the object to be measured.

However, it is particularly advantageous for the maximum time $t_{max}$ to be calculated from formula A:

$$t_{max} = \frac{c\rho d_M^3 (l - d_M)}{\eta d_M^3} \ln\left[\frac{aP_M(l - d_M) - T\eta d_M^3}{aP_M(l - d_M)}\right] \quad \text{(Formula A)}$$

Here, values are predetermined for a maximum temperature difference T in [° C.], a heat capacity c in [J/kg/K], a weight ρ in [kg/m³], a measurement beam diameter $d_M$ in [m], a length l in [m], a heat conductivity η in [W/m/K], a absorption coefficient a [no unit], and a measuring beam capacity $P_M$ in [W] of the measuring beam exiting the interferometer at the measuring beam exit.

When the material parameters ρ, c, a, and η of the measuring object are known, they can be directly entered into the above-listed formula. In typical cases, in particular for the use in structures of micro technology, the measuring objects essentially comprise silicon, so that advantageously the values for silicon are selected as the material parameters, with ρ equaling approximately 2.33 kg/m³, c of approximately 670 J/kg/K, a of approximately 1, and η approximately 150 W/m/K.

Of course, the scope of the invention includes the use of known material parameters appropriate for measuring objects made from other materials.

The measuring diameter $d_M$ is advantageously equivalent to the diameter of the measuring beam exiting the interferometer at the measuring beam exit.

In another advantageous embodiment, the interferometer is provided with a focusing device, which allows focusing the measuring beam such that a reduction of the diameter of the measuring point on the object can be achieved. For this purpose the focusing device is arranged in the radiation path of the interferometer such that the measuring beam exiting at the measuring beam exit is focused such that in particular the measuring point on the object is approximately positioned in the focal point of the focusing device so that a measuring spot as small as possible is created.

Advantageously, a light source of the interferometer is embodied such that it creates an essentially monochromatic light beam with a wave length λ. In combination with the above-described focusing device the diameter of the measuring beam $d_M$ at the measuring point can be calculated, i.e. the diameter of the measuring spot, using the formula B $$d_M = \frac{1.22\lambda}{NA} \quad \text{(Formula B)}$$

with NA essentially being equivalent to the numeric aperture of the focusing device.

In another advantageous embodiment the light source is embodied such that it creates light with a short coherence length. A light beam emitted by the light source is then provided with no specific wave length, rather it comprises partial light beams with different wave lengths. A calculation of the diameter of the measurement spot according to the formula B is possible, though, by using an average wave length λ of the light beam created.

The predetermined length l preferably amounts to at least $d_M$, in particular twenty times the amount of $d_M$. This is particularly advantageous for measuring micro structures, because here, as a guideline, the expansion of a structure to be measured having a size approximately twenty times the diameter of the measuring spot can be estimated.

The variable T in the above-mentioned formula states the maximum temperature difference, which shall be maximally achieved between the micro structure and the environment. The higher the maximum temperature difference the greater the resulting permissible maximum measuring duration $t_{max}$.

In order to avoid a falsification of the measuring results it is generally beneficial to select a maximum temperature difference T no larger than 500° C. In particular when measuring micro structures made from silicon experience has shown, though, that a temperature difference of 100° C. should not be exceeded in order to avoid the destruction of individual elements of the micro structures.

In another advantageous embodiment, the signal processing unit is embodied such that at least two measuring processes can be performed after each other, with one collection of measuring data occurring each. A pause of at least a predetermined time $t_p$ is performed between the two measuring processes, in which no collection of measuring signals occur and thus no switching signals are emitted by the signal processing unit to the switched beam entry of the interferometer. During the pause between the two measuring processes the measuring point on the object is therefore not impinged by any radiation of the measuring beam.

This allows the performance of several measurements after each other, for example, increasing the accuracy of the measuring results by averaging several measurements.

During the pause between the two measurement processes the object to be measured cools in the area of the measuring point so that the heating of the measurement object is reduced.

According to the invention it is advantageous for the time between the two measuring processes $t_p$ to be selected such that the temperature is reduced approximately to a proportion 1/e (using the Euler's integral e) of the temperature at the end of the measuring process. The time necessary for declining to the proportion 1/e can be estimated using the formula C $$t_p = \frac{c\rho d_M^3 (l - d_M)}{\eta d_M^3} \quad \text{(Formula C)}$$

using the parameters described for formula A. Therefore, it is advantageous for the time $t_p$ between the measuring processes to be at least equivalent to the value calculated by formula C.

Typically, in the measuring device according to the invention, after the emission of a switching signal to the switched beam entry of the interferometer, measuring signals do not directly connect to the measuring signal exit of the detector, which could be measured by the signal processing unit. This is caused, on the one hand, in the fact that internal switching processes in the interferometer need a certain amount of time for a measuring beam to exit the interferometer after the connection of a switching signal to the switched beam entry. Furthermore, a certain amount of time elapses until the interfering light beams hit the optic detector and the optic detector emitting the measured information as a measuring signal to its exit.

For this reason, it is advantageous for the signal processing unit to emit a switching signal to the switched beam entry of the interferometer prior to the collection of measuring data for a preparatory time $t_{vor}$. The preparatory time $t_{vor}$ should be selected such that it considers the above-mentioned times, i.e. both the signaling time as well as the delay due to the optic components.

This way it is ensured that, at the beginning of the collection of measurement data by the signal processing unit, measurement signals, which can immediately be processes, can be collected by the detector.

Of course, it is also within the scope of the invention to begin with the collection of measurement signal simultaneously with the emission of the switching signal to the switched beam entry of the interferometer. The measurement data collected during the above-mentioned preparatory time are to be excluded from the evaluation in any case, though, because they do not allow any useful evaluation.

In another advantageous embodiment the measuring device according to the invention is embodied such that the light source of the interferometer is a light source that can be switched, i.e. that it creates a light beam dependent on a switching signal. For this purpose, the light source is provided with an entry switch, which is connected to the light entry switch of the interferometer and thus to the signal processing unit.

However, it is particularly advantageous that the interferometer comprises an optic switching element, which is connected with a switched beam entry of the interferometer and is arranged in the radiation path of the interferometer such that, when a switching signal is connected, a measuring beam is emitted from the measuring beam exit of the interferometer essentially at a predetermined angle and accordingly, when no switching signal is connected, no measuring beam is emitted from the measuring beam exit of the interferometer at an essentially predetermined angle.

Here, several embodiments of the optic switching element as well as various positions are possible, at which the switching element can be arranged.

For example, it is within the scope of the invention that the optic switching element may also be arranged outside the machine unit of the measuring device, e.g., immediately at the measuring object and connected to the switched beam entry of the interferometer via a flexible wire or another type of signal transmission. In this case, due to the functional cooperation with the interferometer, the optical switching element is to be considered the measuring beam exit of the interferometer, regardless if a measuring beam is existing between the interferometer and the optical switching element before the switching signal, however the measuring beam exits the optical switch element (and thus the measuring beam exit of the interferometer) at essentially the predetermined angle and lights the measuring spot only when the switching signal is connected to the switched beam entry of the interferometer.

However, it is particularly advantageous to arrange the optic switch element inside the interferometer in the radiation path of the interferometer such that, dependent on the condition of the optic switch element, i.e. dependent on the presence of a switching signal at the switched beam entry of the interferometer, a measuring beam exits the interferometer.

In a preferred embodiment, the optic switching element is embodied as a Bragg cell, known per se, in combination with a radiation trap. The Bragg cell is connected to the switched beam entry of the interferometer and the Bragg cell and the radiation trap are arranged in the radiation path of the interferometer such that a measuring beam exits the measuring beam exit of the interferometer when a switching signal is connected.

However, if no switching signal is connected to the switched beam entry of the interferometer, the light beam passing through the Bragg cell is deflected by the Bragg cell into the radiation trap so that no measurement beam exits the measurement beam exit of the interferometer.

In another advantageous embodiment the switching element is embodied as a mechanical shutter, for example in the form of a mechanical diaphragm known per se. Additionally, it is within the scope of the invention that the optical switching element is embodied as an electro-optic shutter, in particular as an LC-rotator with a polarizer known per se. In this exemplary embodiment the LC-rotator with polarizer is embodied such that the polarization of the LC rotator corresponds to the polarizer only when a switching signal is connected to the LC rotator, i.e. that light beams can pass through the LC-rotator and polarizer. However, if no switching signal is present at the LC-rotator, the LC rotator cooperates with the polarizer as a shutter, i.e. no light beams pass through.

In another preferred embodiment, the measuring device is embodied as a laser—Doppler vibrometer. For this purpose, a light source is embodied as a laser and the signal processing unit determines the phase difference of the two interfering beams impinging the detector via a displacement decoder known per se.

Furthermore, it is advantageous for the interferometer to be embodied such that a temporally constant frequency difference between the second and the first partial beam is created. This way, additionally the direction of the motion of the measuring point of the object to be measured can be determined. The measuring device is equivalent in its basic structure to a heterodyne laser—Doppler vibrometer.

In another advantageous embodiment, the measuring device is embodied such that several measuring points behind one another on the object can be measured. By such a scanning measuring process the object to be measured can be covered with a measuring grid, with measurements being performed for each measuring spot temporarily following each other. This can be implemented, for example, such that the measuring device is provided with a X-Y-table for supporting the object to be measured, with its level of motion essentially being perpendicular to the measuring beam exiting the interferometer at the measurement beam exit. The X-Y-table is connected to the signal processing unit, which controls the positioning of the object to be measured in reference to the measurement beam for each measuring process.

In another preferred embodiment, the measuring device is embodied as a scanning con-focal laser—Doppler vibrometer. The basic structure of such a vibrometer is known from:

Christian Rembe, Alexander Draebenstedt, "The Laser-Scanning Confocal Vibrometer Microscope", Optical Measurement Systems for Industrial Inspection IV, SPIE Vol. 5856, 13-17 June, Munich, Germany, pp. 698-709.

Here, as explained above, the measuring device is further provided with a focusing device, which allows the focusing of the measuring beam to the measuring spot of the object to be measured. By the confocal embodiment the light beams reflected by the object to be measured but not positioned in the focus level of the focusing device are suppressed. As a result, a considerable reduction of diffused light is achieved, which increases the effective resolution and thus the quality of the measuring signal of the measuring device according to the invention.

BRIEF DESCRIPTION OF THE DRAWINGS

In the following, an exemplary embodiment is explained in greater detail using the attached drawing. Shown is.

DETAILED DESCRIPTION OF THE PREFERRED EMBODIMENT

Figure 1:
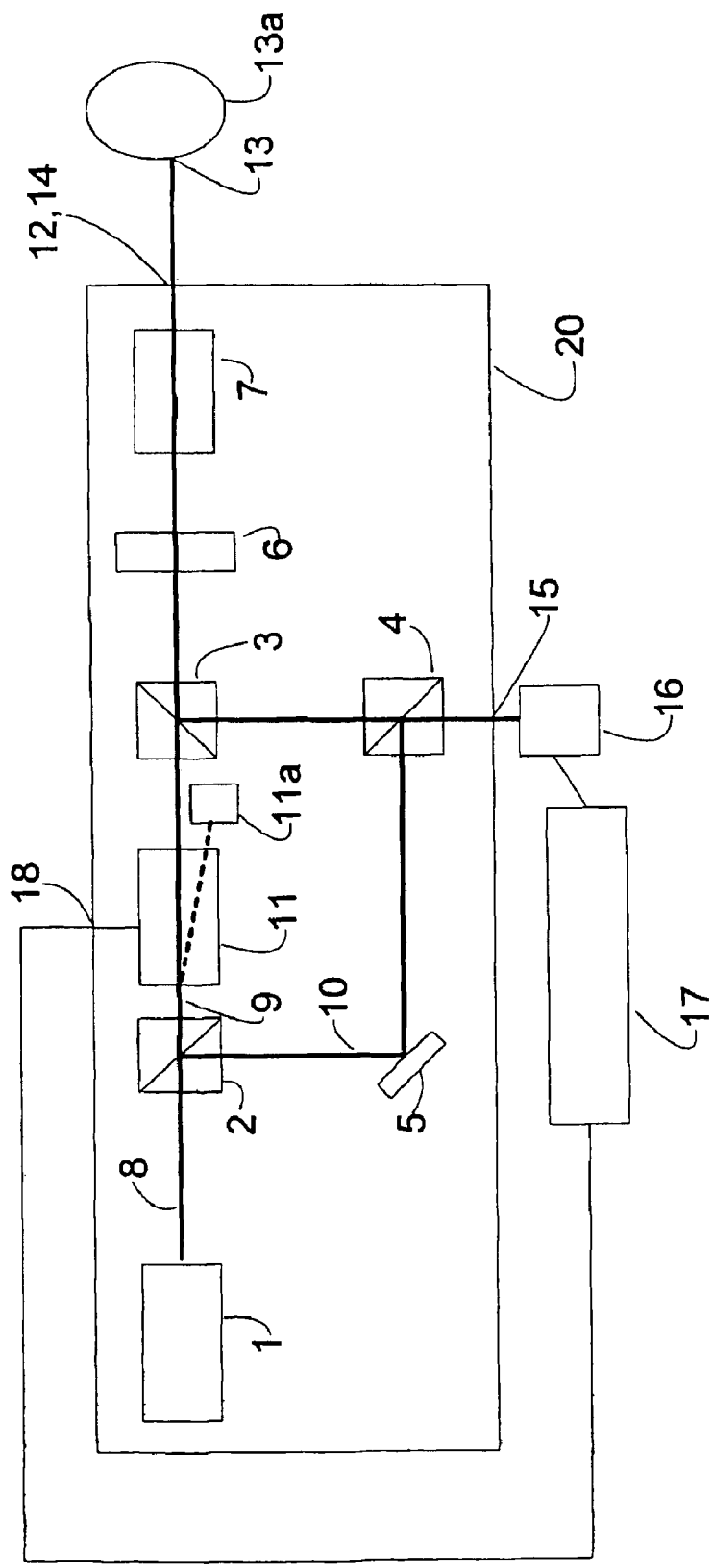
FIG. 1 a schematic view of an exemplary embodiment of the measuring device according to the invention, with the optic switching element being embodied as a Bragg cell in combination with a radiation trap.

The exemplary embodiment shown in FIG. 1 is embodied as a heterodyne laser—Doppler vibrometer.

The interferometer 20 of the measuring device comprises a light source embodied as a laser 1, a first polarization beam splitter 2, a second polarization beam splitter 3, a beam splitter 4, a deflection mirror 5, a λ-quarter plate 6, and a focusing device embodied as a microscope-lens 7. The laser 1 creates a monochromatic light beam 8 with the wave length λ, which is split into a first partial beam 9 and a second partial beam 10 by a first beam splitter 2. The first partial beam 9 passes a Bragg cell 11, the second polarization beam splitter 3, the λ-quarter plate 6, and the microscope lens 7. Subsequently the first partial beam 9 exits the measuring beam exit 12 of the interferometer as the measuring beam and impinges the measuring point 13 of the object 13a to be measured.

The measuring beam (i.e. the reflection beam) reflected from the object reenters the interferometer 20 through the reflection beam entry 14, which in this exemplary embodiment is identical to the measuring beam exit 12, passes through the microscope lens 7, the λ quarter plate 6, is deflected to the beam splitter 4 by the second polarization beam splitter 3, and exits the interferometer 20 at the interfering beam exit 15 after passing through said beam splitter.

The second partial beam 10 is also deflected by the deflection mirror 5 to the beam splitter 4 and interferes the reflection beam in the beam splitter 4 so that the second partial beam 10 exits the interferometer at the interference beam exit 15 together with the interfered reflection beam.

The microscope lens 7 is arranged such, in reference to the measuring point 13 of the lens 13a, that the measuring beam is focused on the measuring point 13.

The measuring device further comprises a photo detector 16, which is arranged at the interfering beam exit 15 of the interferometer such that the second partial beam with the interfered reflection beam impinges the measuring surface of the photo detector 16.

In this exemplary embodiment, the photo detector is embodied such that it emits a measuring signal dependent on the intensity of the impinging interfering beams.

The measuring device is further provided with a signal processing unit 17 connected to the photo detector 16 for measuring the measuring signals of the photo detector.

The Bragg cell 11 causes a frequency shift of the first partial beam 9 in reference to the second partial beam 10 during the passing of said Bragg cell 11. In this way, the Doppler interferometer becomes a heterodyne Doppler interferometer so that the signal processing unit 17 can also determine the direction of the motion of the measuring point 13 by evaluating the measuring signals of the photo detector 16.

It is essential that the interferometer 20 is provided with a beam switching unit 18, which is connected on the one side to the signal processing unit 17 and on the other side to the Bragg cell 11.

The Bragg cell 11 is embodied such that, when a signal is emitted by a signal processing unit, which therefore is connected to the Bragg cell 11, the first partial beam 9 passes the Bragg cell 11 in a path indicated as a straight line. However, if no beam switching signal is connected to the beam switching entry 18 of the interferometer and thus to the Bragg cell 11 the first partial beam 9 is deflected according to the dot-dash line so that the first partial beam 9 ends in a radiation trap 11a. Therefore, in the latter case no measuring beam exits the measuring beam exit 12 of the interferometer.

The signal processing unit is embodied such that during the measurement a switching signal is emitted at the beam switching entry 18 of the interferometer 20 and after concluded measurements no switching signal is emitted any longer to the beam switching entry of the interferometer.

Before a measurement process is performed via the measuring device, parameters are entered into the signal processing unit 17, which allow a determination of the minimum measurement time $t_{min}$ and maximum measuring time $t_{max}$. The minimum measuring time $t_{min}$ results from the inverse of the predetermined minimum frequency $f_{min}$ to be resolved.

The maximum measuring time $t_{max}$ results from the above-mentioned formula A, with the diameter $d_M$ of the measuring beam also being determined by the above-mentioned formula B, using the wave length λ of the light beam 8 created by the laser 1 and the numeric aperture NA of the microscope lens 7.

Depending on the object to be measured the material parameters ρ, c, a, and η are predetermined. When the object to be measured is essentially made from silicon, for example, the above-described material parameter are predetermined for silicon.

The length l is predetermined as twenty times diameter $d_M$ of the measuring beam, the maximum temperature difference T can optionally be adjusted by the user or be predetermined as 100° C.

The calculations result in a minimum and a maximum time for the measuring process. If the calculated maximum measuring term $t_{max}$ is longer than the minimum measuring term $t_{min}$, a measurement is performed with a time being a multitude of $t_{min}$, which is smaller or equal $t_{max}$. Therefore, for a given $t_{min}$ the greatest possible integer ηmax is determined, conditional to $\eta_{max} \cdot t_{min} \leq t_{max}$. A measurement can then be performed with the measuring term $\eta \cdot t_{min}$, with the integer value of factor η being selected between 1 and $\eta_{max}$.

However, when the maximum measuring term $t_{max}$ is smaller than the minimum measuring term $t_{min}$, an alarm is given to the user by the signal processing unit 17 via a display unit (not shown).

The user can correct the predetermined value or select a measuring mode by performing several measuring processes with a term $t_{max}$ after each other, with a pause of the term $t_{max}$ being performed between the measuring processes, with the signal processing unit not emitting a switching signal of the interferometer 20, so that the measuring point 13 of the object is not impinged by a measuring beam during said pause.

Here, so many measuring processes are performed with a measuring term $t_{max}$ each that the summarized term of the measuring devices is longer or equal to the minimum measuring term $t_{min}$.

This device according to the invention allows for the first time to measure objects with a highly focused measuring beam and simultaneously a high intensity of the measuring beam without interfering with or destroying the object to be measured by high energy input.

This allows a new dimension of measuring accuracy, in particular for objects of micro technology, because any resonance frequencies to be measured increase as the components become smaller. Therefore, in order to measure objects of micro technology high measuring ranges are necessary, which set increased requirements to the quality of the measurement, in particular to the signal-noise ratio. With the present invention a distinct improvement of the quality of the measuring signal can be achieved using a previously impossible increase in intensity of the measuring beam so that measurements with a higher measuring range are possible.

The invention claimed is:

1. A measuring device for optical measuring of an object (13a), comprising:
   an interferometer (20) with
      a measuring beam exit (12),
      a reflection beam entry (14),
      an interference beam exit (15), and
      a light source (1) for creating a light beam (8),
      a beam splitter to split the light beam into first and second partial beams (9, 10), with the first partial beam (9) which acts as a measuring beam exiting the measuring beam exit (12) essentially at a predetermined angle and the second partial beam (10) being interfered with a reflection beam entering through the reflection beam entry (14), and the second partial beam (10) exiting with the interfered reflection beam at the interference beam exit (15),
      an optic detector (16) arranged at the interference beam exit (15) of the interferometer (20) such that a light beam exiting the interfering beam exit (15) impinges the detector (16),
      a signal processing unit (17), which is connected to the detector (16) to collect and/or process measuring signals of the detector (16),
      a switched beam entry (18) that, depending on a switching signal connected to the switched beam entry (18), causes the first partial beam to exit the measuring beam exit (12) at a generally predetermined light intensity and at a predetermined angle, and the signal processing unit (17) is provided with a beam switching exit, which is connected to the beam switching entry (18) of the interferometer, the signal processing unit (17) controls the interferometer such that the first partial beam generally with the predetermined light intensity only exits the measuring beam exit (12) during a measuring of measuring signals for taking measurements and at the predetermined angle.

2. A measuring device according to claim 1, wherein the interferometer is provided with a dimmer unit, which is arranged in a radiation path of the measuring beam, and connected to the switched beam entry (18), the dimmer unit, in a connected state when the switching signal is connected, allows the measuring beam to pass through the dimmer unit generally without any loss of intensity, and in a second, no switching signal state when no switching signal is connected to the dimmer unit, causes an intensity of the measuring beam to be reduced by a predetermined factor by the dimmer unit.

3. A measuring device according to claim 2, wherein the dimmer unit is in the second, no switching signal, the intensity of the measuring beam is reduced by at least 90%.

4. A measuring device according to claim 3, wherein the dimmer unit is in the second, no switching signal state, the measuring beam is blocked.

5. A measuring device according to claim 1, wherein the signal processing unit (17) measures measuring signals of the detector (16) at least for a term $t_{min}$, with $t_{min}$ being equivalent to an inverse of a predetermined minimum frequency $f_{min}$.

6. A measuring device according to claim 1, wherein the signal processing unit (17) measures measuring signals of the detector (16) for a period no longer than a predetermined maximum term $t_{max}$.

7. A measuring device according to claim 6, wherein $t_{max}$ is calculated from the formula $$t_{max} = \frac{c\rho d_M^3 (l-d_M)}{\eta d_M^3} \ln\left[\frac{aP_M(l-d_M) - T\eta d_M^3}{aP_M(l-d_M)}\right]$$

using predetermined values for a maximum temperature difference T, a heat capacity c, a weight ρ, a measuring beam diameter $d_M$, a length l, a heat conductivity η, an absorption coefficient a, and a measuring beam capacity $P_M$ of the measuring beam exiting at the measuring beam exit of the interferometer.

8. A measuring device according to claim 7, wherein values are selected for the material parameters ρ, c, a, and η, which are generally equivalent to material parameters of the object to be measured.

9. A measuring device according to claim 7, wherein the measuring beam diameter $d_M$ is equivalent to a diameter of the measuring beam exiting the interferometer (20) at the measuring beam exit (12).

10. A measuring device according to claim 7, wherein the interferometer (20) further comprises a focusing device (7), which is arranged in the radiation path of the interferometer (20) such that the first partial beam exiting at the measuring beam exit (12) is focused, and the light source (1) of the interferometer (20) creates an essentially monochromatic light beam (8) with a wave length λ or a light beam with partial light beams of several wave lengths, with λ being an average value of the wave lengths of the partial light beams, and the diameter $d_M$ of the measuring beam is predetermined by the formula $$d_M = \frac{1.22\lambda}{NA}$$

with NA generally being equivalent to a numeric aperture of the focusing device (7).

11. A measuring device according to claim 7, wherein the predetermined length l amounts to at least $d_M$.

12. A measuring device according to claim 7, wherein the predetermined maximum temperature difference T amounts to a maximum of 500° C.

13. A measuring device according to claim 6, wherein the signal processing unit (17) performs at least two measuring processes with one collection of the measuring signals each, with a pause of at least a predetermined period $t_P$ being performed between the two measuring processes, in which no collection of measuring signals occurs, and no switching signal is emitted to the switched beam entry (18) of the interferometer (20), with $t_P$ being at least $$t_p \geq \frac{c\rho d_M^3 (l-d_M)}{\eta d_M^3}.$$

14. A measuring device according to claim 1, wherein the signal processing unit (17) emits a switching signal to the switched beam entry (18) of the interferometer (20) for the lead-time $t_{vor}$ prior to the collection of measuring data.

15. A measuring device according to claim 1, wherein the interferometer (20) further comprises an optic switching element, which is connected to the switched beam entry (18) of the interferometer (20) and arranged in the radiation path of the interferometer, when a switching signal is connected, a measuring beam exits the measuring beam exit (12) of the interferometer (20) at a predetermined angle and, when no switching signal is applied, no measuring beam exits the measuring beam exit (12) of the interferometer (20) at generally the predetermined angle.

16. A measuring device according to claim 15, wherein the optic switching element comprises a Bragg cell (11) or a mechanical shutter.

17. A measuring device according to claim 15, wherein the optic switching element comprises an electro-optic shutter.

18. A measuring device according to claim 1, wherein the measuring device comprises a vibrometer.

19. A measuring device according to claim 18, wherein the vibrometer comprises a heterodyne interferometer.

20. A measuring device according to claim 18, wherein the measuring device comprises a scanning confocal laser—Doppler vibrometer.

* * * * *